(No Model.)

T. J. HOYT.
APPARATUS FOR PURIFYING WATER.

No. 445,780. Patented Feb. 3, 1891.

Witnesses:
Geo. A. Gregg.
P. M. Hulbert

Inventor,
Thomas J. Hoyt,
By Thos. S. Sprague & Son
Atty.

UNITED STATES PATENT OFFICE.

THOMAS J. HOYT, OF MOUNT CLEMENS, MICHIGAN.

APPARATUS FOR PURIFYING WATER.

SPECIFICATION forming part of Letters Patent No. 445,780, dated February 3, 1891.

Application filed April 7, 1890. Serial No. 346,801. (No model.)

*To all whom it may concern:*

Be it known that I, THOMAS J. HOYT, a citizen of the United States, residing at Mount Clemens, in the county of Macomb and State of Michigan, have invented certain new and useful Improvements in Apparatus for Purifying Water, of which the following is a specification, reference being had therein to the accompanying drawings.

This invention relates to new and useful improvements in apparatus for purifying water, adapted for the purification of water by means of a reagent introduced into the water while pumping it into the filter or settling-basin.

My invention consists more particularly in the peculiar construction of a device for feeding the reagents, all as more fully hereinafter described, and shown in the accompanying drawings, in which—

Figure 1:
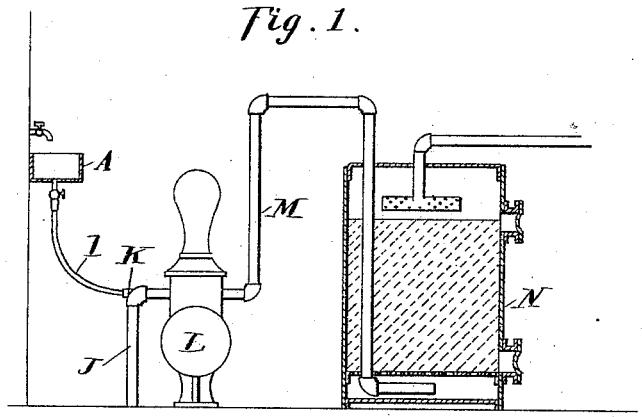
Figure 2:
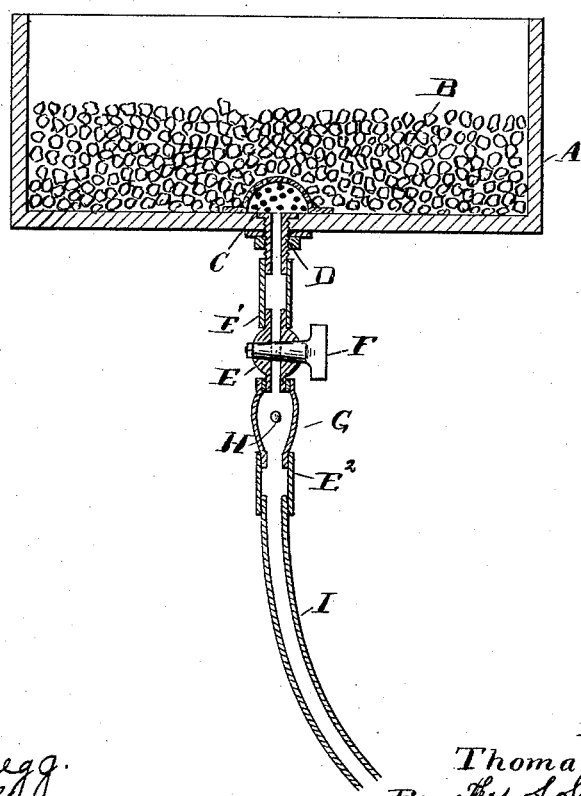

Figure 1 is a diagram elevation showing the general arrangement of the device in connection with the pump. Fig. 2 is a vertical central section showing the construction of the device more in detail.

A is a tank or receiver in which the reagent is contained, or in which it is generated. B is the reagent contained in said tank—such as alum or other coagulent—in solid form.

C is the screen or sponge placed over the discharge-opening in the bottom of the receiver.

D is a discharge-nipple, secured in the bottom of the receiver by a suitable lock-nut.

E is a valve connected to the lower end of the discharge-pipe by a flexible hose connection E'.

F is a glass or gutta-percha faucet for the valve.

G is a glass globe or tube, secured vertically below the valve and communicating therewith.

H represents a drop of the coagulent made visible through the glass tube as it drops from the valve.

I is a pipe of lead or other suitable material that will not be affected chemically by the reagent.

E'' is a flexible hose connection between the pipe I and the lower end of the glass tube.

J is the suction-pipe of the pump.

K is the connection of the pipe I with the suction-pipe of the pump.

L is the pump.

M is the discharge-pipe of the pump, and N is a filter into which the water from the pump is discharged. Instead of the filter, however, a settling-basin may be substituted.

In practice, the parts being arranged substantially as described and shown, the operation of the device is as follows: When the pump is running, a vacuum is maintained in the pipe I by the suction of the pump, and therefore if any liquid is contained in the receiver A the same will be drawn on opening of the faucet F through the screen C, valve E, and pipe I into the suction-pipe of the pump, and thereby impregnate the water with the reagent. The amount of reagent needed to purify a given quantity of water being known, it is obvious that by means of the sight afforded through the glass tube, the amount of reagent to be discharged into the pipe I through the valve can be adjusted correctly by adjusting the faucet F. As the amount needed will not be more than a drop at short intervals, it will be only necessary to regulate the number of drops required to escape in a given time, and a close regulation is, therefore, easy.

The operator may readily experiment with the device by detaching the pipe I below the glass tube and collecting the drops to find out exactly the quantity represented by a certain number of drops. Should another reagent be needed, the tank may be readily detached and another one substituted, and if the valve should become clogged it may be taken off and cleaned, which on account of the flexible-hose connection is an easy matter. These connections being preferably made of rubber, keep readily air-tight by the vacuum created by the pump, and are not affected by the jarring of the parts. Where the reagent readily dissolves in water, the receiver is partly filled with the reagent in solid form, and water is poured on top and may be kept supplied in proper quantity, as needed, from a faucet.

What I claim as my invention is—

In an apparatus for purifying water, the combination, with the suction-pipe of a pump, of a receiver for a reagent, provided at its bottom with a discharge-nipple, a valve, a connection between the same and the nipple, a transparent globe secured directly beneath the valve, a pipe I between the globe and suction-pipe, and a detachable flexible coupling or union between said pipe I and the globe, substantially as described.

In testimony whereof I affix my signature, in presence of two witnesses, this 27th day of February, 1890.

THOMAS J. HOYT.

Witnesses:
A. E. VAULPT,
T. SUNGONHAUSEN.